July 9, 1946.　　　　F. LE B. LORD　　　　2,403,810
INSERT
Filed July 24, 1945
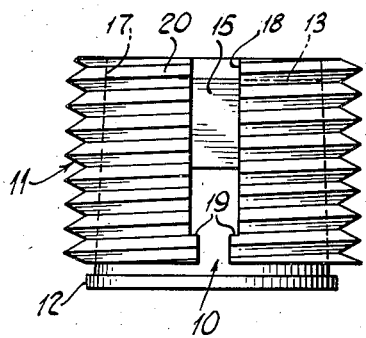
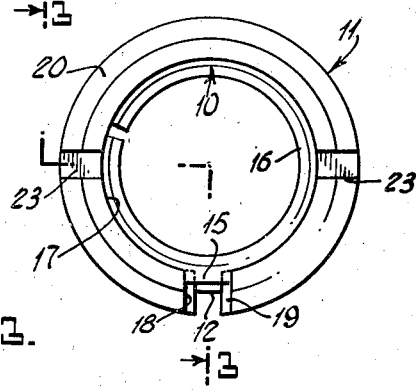
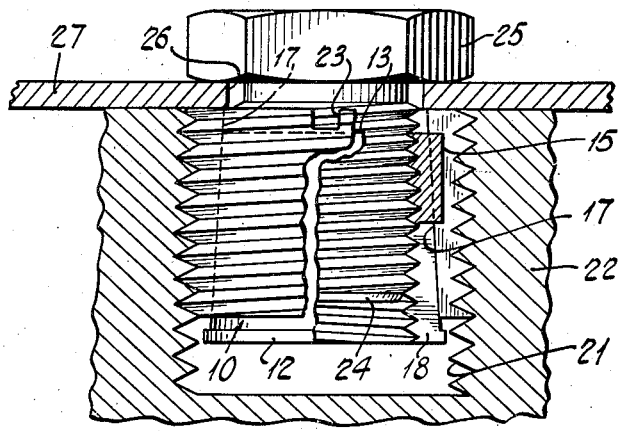
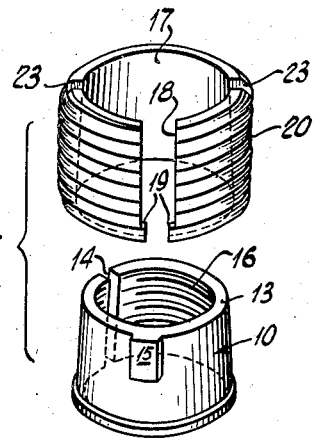
INVENTOR
F. LE BARRON LORD.
BY
ATTORNEY Patented July 9, 1946

2,403,810

UNITED STATES PATENT OFFICE 2,403,810

INSERT

Francis Le Barron Lord, Bloomfield, N. J., assignor to Titelox Manufacturing Company, Montclair, N. J., a corporation of New Jersey Application July 24, 1945, Serial No. 606,777

3 Claims. (Cl. 85—32)

This invention relates to improvements in inserts and particularly to inserts adapted for use in connection with plastic, aluminum, and other objects having threaded bores or apertures for the reception of said inserts, to enable other objects to be secured thereto.

An object of this invention is to provide an insert consisting of two parts or members, one of which is keyed to and axially movable in the other, to expand the latter into engagement with the bore in which the insert is positioned.

A further object of the invention is to provide an insert of the character described of such structural features that the internal member thereof, which is initially forced into the external member thereof is precluded from accidental displacement while permitting of the relative axial movement thereof within the external member.

An embodiment of a structure employing my invention is shown in the accompanying drawing and described in detail in the ensuing specification. This embodiment is merely by way of example; my invention is not limited thereto but includes all other forms which would come within the scope of the appended claims.

In the drawing:

Fig. 1 is a side elevational view of an insert embodying my invention,

Fig. 2 is a top plan view thereof,

Fig. 3 is a vertical, partly sectional, partly fragmentary, view taken on line 3—3 of Fig. 2 in the direction of the arrows, but showing the insert positioned in a threaded bore and engaged by a bolt member holding a second object to that containing the bore, and Fig. 4 is a perspective view of the members comprising the insert, shown disassembled.

In the embodiment of my invention shown in the drawing, the insert comprises an internal member 10 which, on assembly of the parts as shown in Fig. 1, is keyed in external member 11 for axial reciprocation therein. The internal member 10 is externally tapered, has an internal threaded aperture 16, is provided with key 15 projecting externally there from and with peripheral flange 12 defining the lower end thereof, and with an axial slit 14. The external member 11 is externally threaded as at 20 and is provided with an internal tapered aperture 17 for the reception of the internal member 10, and with an axial slit or keyway 18 for the reception of key 15 of the internal member. The external member 11 is further provided with ledges 19 protruding into the axial slit 18 and serving as a stop against which the key 15 will abut when internal member 10 is moved downwardly in external member 11, to preclude accidental displacement of the key from the keyway. The peripheral flange 12 of the internal member 10 precludes excessive movement of the internal member upwardly in the external member.

The stop ledges 19 of the external member may be formed of the material of said external member or may be separately formed and affixed to the external member to partly close the axial slit 18 thereof for the purpose above described.

In operation, the insert parts shown in Fig. 4 are brought together under pressure by the use of any suitable tools or other mechanism for that purpose, the relative dimensions of the parts being such that the key 15 may be initially forced past the stop ledges 19 to assemble the parts as shown in Fig. 1. The key 15 then snaps into the axial slit 18; the parts are thus effectively united to function as a unit which cannot be accidentally disassembled.

In operation, the insert is adapted to be initially positioned in the threaded bore 21 or other opening of the member 22 which may be of plastic, aluminum, or other material. The external member is preferably provided at the upper end thereof with transverse recesses 23 adapted to be engaged by any suitable tool to initially thread the insert into the bore.

The internal member is adapted to receive the stem or shank of the member to be held therein. As shown in Fig. 3, the member to be held therein may consist of a bolt 25 having the threaded shank 24, by means of which an object 27 (having an aperture 26 through which the threaded shank of the bolt passes) may be secured to the object 22 in which the insert is positioned. In the assembly of the parts to the position shown in Fig. 3, the threading of the bolt 25 in the internal threaded aperture 16 of the insert axially moves the internal member 10 in the external member 11, thereby contracting the internal member upon the shank 24 of the bolt and simultaneously expanding the external member in the bore 21. The insert is thus effectively locked in the object 22 and the second object 27 is locked thereto.

The key 15 has positive flat holding faces engaging the walls of slit 18 and is located at a predetermined circumferential point relative to the slit 14. The arrangement shown in Fig. 4 is one of an infinite number of possible locations of the slit 14 circumferentially relative to the key 15. Said relative location enables a predetermined wrapping effect to be obtained in use of the insert to resist the tendency of the parts to become disengaged after their threaded engagement with the bolt 25 or other object.

The term "predetermined wrapping effect" as used in the specification and claims hereof shall be deemed to mean the location of the slit 14 relative to the keying means so that on engagement or disengagement of the members by threading the bolt 25 into the insert, a wrapping effect is attained where the slit is located other than 180° from the keying means, and, where the slit is located at 180° from the keying means, the wrapping effect is nil—in short, the term shall be deemed to mean predetermining whether and if so the degree of the wrapping effect to be attained by the relative location of the parts referred to.

While I have shown key 15 for reception in the keyway or slit 18 it will be understood that other keying means may be used for the same purpose within the scope of this invention. The key 15 is preferably of less axial length than the internal member 10 for the purpose set forth above.

The parts may be made of any desirable or suitable material and the dimensions thereof may be varied to suit the requirements of the use to which the same are to be put, the representation in the drawing being solely for the sake of illustrating one embodiment of the invention.

Having thus described my invention what I claim as new and desire to secure by Letters Patent, is:

1. An insert comprising an externally threaded member for threaded engagement with a threaded aperture, said member being provided with an axial slit and having an internal tapered aperture, and an internal member externally complementarily tapered and adapted to be inserted into said first named member, said internal member being internally threaded for engagement by a threaded member and being provided with an axial slit and with an external key adapted to be received in the slit of said first mentioned member to key the internal member therein for axial reciprocation therein, said key being so disposed relative to the slit of the internal member as to provide a predetermined wrapping effect when the parts are assembled and engage a threaded member, and stop ledges projecting into and partly closing the slit of the external member to preclude accidental displacement of the key therefrom.

2. An insert comprising an externally threaded member for threaded engagement with a threaded aperture, said member being provided with an axial slit and having an internal tapered aperture, and an internal member externally complementarily tapered adapted to be inserted into said first named member, said internal member being internally threaded for engagement by a threaded member and being provided with an axial slit and with an external key adapted to be received in the slit of said first mentioned member to key the internal member therein for axial reciprocation therein, and being further provided with a peripheral flange at the lower end thereof, said key being so disposed relative to the slit of the internal member as to provide a predetermined wrapping effect when the parts are assembled and engage a threaded member, and stop ledges on said first named member projecting into and partly closing the slit thereof to preclude accidental displacement of the key therefrom.

3. An insert comprising an externally threaded member for threaded engagement with a threaded aperture, said member being provided with an axial slit and having an internal tapered aperture, and an internal member externally complementarily tapered adapted to be inserted into said first named member, said internal member being internally threaded for engagement by a threaded member and being provided with an axial slit and with an external key adapted to be received in the slit of said first mentioned member to key the internal member therein for axial reciprocation therein, said key having positive holding faces and said slit of the internal member being adapted to be engaged by said holding faces, said internal member being further provided with a peripheral flange at the lower end thereof, said key being so disposed relative to the slit of the internal member as to provide a predetermined wrapping effect when the parts are assembled and engage a threaded member, and a member on said external member projecting into and partly closing the slit thereof to preclude accidental displacement of the key therefrom.

FRANCIS LE BARRON LORD.